June 12, 1923.
H. L. NELSON
CORN HUSKING MACHINE
Filed Dec. 1, 1922
1,458,721
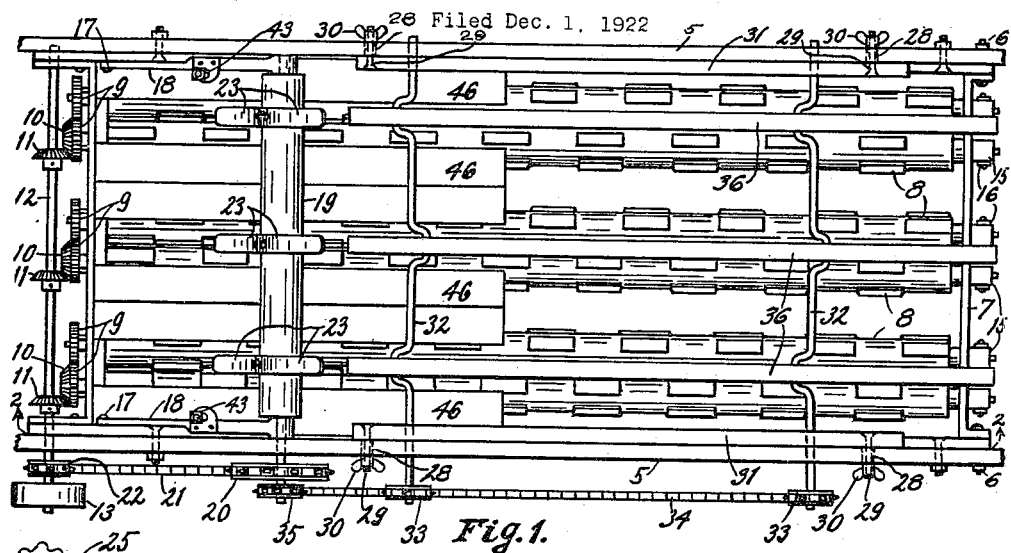
Fig.1.
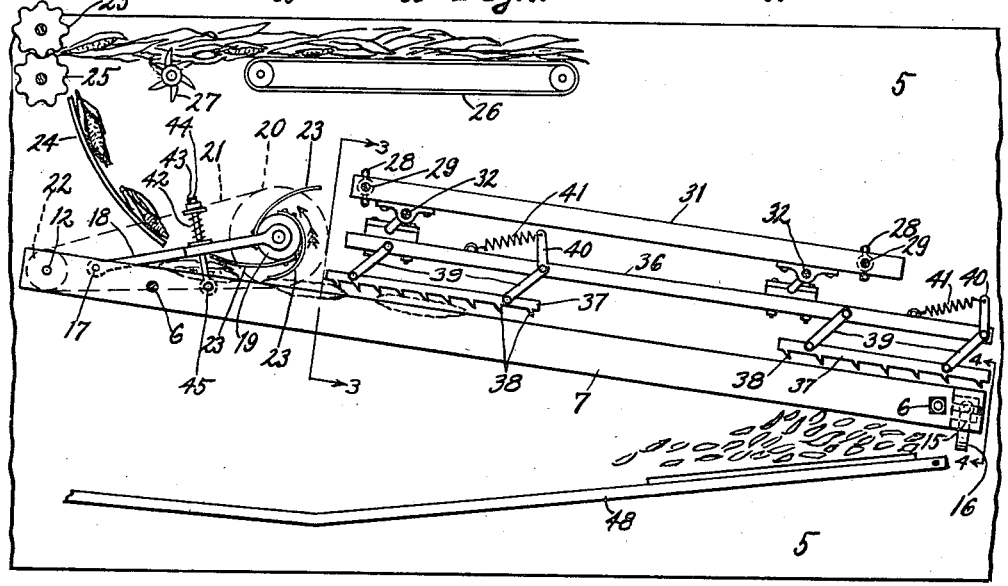
Fig.2.
Fig.3.
Fig.4.
INVENTOR.
Henry L. Nelson
By A. M. Carlsen,
Attorney Patented June 12, 1923.

1,458,721

UNITED STATES PATENT OFFICE.

HENRY L. NELSON, OF CANNON FALLS, MINNESOTA.

CORN-HUSKING MACHINE.

Application filed December 1, 1922. Serial No. 604,420.

*To all whom it may concern:*

Be it known that I, HENRY L. NELSON, a citizen of the United States, residing at Cannon Falls, in the county of Goodhue and State of Minnesota, have invented certain new and useful Improvements in Corn-Husking Machines, of which the following is a specification.

My invention relates to corn husking machines and the object is to improve such machines by the particular means hereinafter to be described and claimed.

In the accompanying drawing;

Fig. 1 is a top or plan view of a corn husker embodying my improvements.

Fig. 2 is a longitudinal vertical section on the line 2—2 of Fig. 1 with the guides 46 in Figs. 1 and 3 omitted and a feeding device added.

Fig. 3 is a section on the line 3—3 in Fig. 2.

Fig. 4 is an enlarged view on the line 4—4 in Figs. 1 and 2.

Referring to the drawings by reference numerals, 5 designates the vertical, parallel, spaced side walls of a suitable main frame which may rest on legs or on wheels (not shown). In said frame is secured by bolts 6 a yoke shaped metal frame 7 in which are journaled several pairs of husking rollers 8 of any ordinary construction. Each pair of the rollers is geared together by gears 9 and one in each pair having a bevel gear 10 driven by a bevel gear 11 fixed on a shaft 12, the latter having a pulley 13 driven by a belt (not shown).

In Fig. 4 is best shown that the husking rollers have their ends journaled in horizontal slots 14 in the frame and in boxes 15 outside the frame, and each pair of said boxes are constantly impelled toward each other by a U-shaped spring 16. This is what causes each pair of the rollers to grip and pull the husk away from the ears of corn.

Pivoted at 17 to frame 7, or to frame 5, are two parallel spaced arms 18 in the swingable ends of which is journaled a roller 19, one end of which has a sprocket 20, driven by a link belt 21 and a smaller sprocket 22 fixed on shaft 12. On said roller are fixed the inner ends of a series of flat radiating and partly curved, resilient presser arms 23. These arms are arranged in sets of about three arms in each set and operate all in the same plane and tend to press each ear of corn downward into firm engagement with a pair of the husking rollers as soon as the ears are delivered upon the upper end portions of the husking rollers. The presser arms also serve to break up the dry, brittle stalks and stuff usually dropping with the ears of corn down an incline 24 from snapping rollers 25 to which the stalks are fed by an endless conveyer 26 and pass over a band cutter 27 (shown in Fig. 2).

In each side wall 5 are vertical slots 28 for bolts 29 with thumb nuts 30. These bolts hold in a vertically adjustable manner two frame bars 31, to which are journaled two crank shafts 32, which have sprockets 33 driven by a sprocket chain 34 and a sprocket 35 fixed on roller 19, though if so preferred, sprockets 35 may be fixed on the shaft 12.

The cranks of said crank shaft serve to operate a series of connecting bars 36, each of which carries two or more agitators 37 having ratchet teeth 38 by which to move the ears of corn along in the groove formed between the upper sides of each pair of husking rollers.

Each agitator bar 37 is preferably made of channel shaped iron formed with the teeth 38 at the edges of its parallel flanges, and is suspended from the bar 36 by parallel links 39 one of which has a rocker arm 40 connected to the bar 36 by a contraction coil spring 41 which at all times tends to engage the agitator with the ears of corn below it.

The arms 18 are constantly under downward pressure of springs 42 (see Fig. 2) which are retained by nuts 43 upon rods 44 slidable through holes in the arms and having their lower ends pivoted as at 45, the nuts serving also to regulate the tension of the springs.

46 are the usual sheet metal guides arranged to guide the ears of corn in between the rollers of each pair and prevent their getting into the spaces between the pairs of rollers. Such guides may extend the full length of the rollers or only over the upper portions of the same.

In the operation of the machine, when the ears of corn and portions of the stalks and other stuff drop upon the guides the resilient arms 23 force said ears and stuff down between the husking rollers so that the latter get a good hold of all but the ear of corn itself. The arms 23 also tend to move the ears and other stuff far enough down the inclined rollers to give the agitators 37 a chance to also impel them toward the lower end of the rollers where the lowest agitator is arranged to act as a rake swinging partly beyond the end of the roller frame 7 so as to fully disengage the ear of corn from such husk as in earlier constructed husking devices will often cause a clogging of ears at the lower end of the roller frame. During said movement of the ears of corn the spring pressed agitators 37 so efficiently press and move the ears that the husking rollers clear them completely of all husk and other matter delivered upon the rollers at their upper ends. As such husk and other stuff are moved downward between the rollers and drop upon suitable conveying means 48 and are carried away out of the machine by a blower or any suitable means.

By changing the bolts 29 up or down in the slots 28 the tension of the agitators upon the corn may be varied. The springs 40 and 42 and the resiliency of arms 23 allow for variation in the size of ears of corn.

What I claim is:

1. In a corn husking machine and mounted in suitable frame work, a series of pairs of inclined rollers, means for delivering unhusked corn upon the upper ends of the rollers, a downwardly spring-pressed roller arranged transversely across the husking rollers near their upper portions and means for rotating the husking roller and said spring pressed roller and a series of resilient elements carried by the spring-pressed roller and peripherically arranged about it in line with each pair of the husking rollers.

2. The structure specified in claim 1, said resilient elements consisting of resilient radial arms secured each with one end to the face of the roller and having its body curved in peripherical direction toward the roller.

3. In a corn husking machine and mounted in suitable main frame work, a series of pairs of inclined husking rollers, special frame bars as 31 secured to the main frame, two crank shafts journaled to the special frame bars, a plurality of parallel rods connecting the cranks of the two crank shafts, toothed agitator bars suspended by links from each connecting bar and means for rotating the two crank shafts in unison at least one of the links holding each agitator being formed with an arm and a spring acting on such arm to always impel the agitator toward the husking rollers below it.

4. The structure specified in claim 3, in which the agitator bars are formed as a channel iron with ratchet teeth upon the edges of its two parallel and downwardly facing flanges.

5. The structure specified in claim 3 and means for adjusting the special frame bars 31 up and down on the main frame.

6. The structure specified in claim 3, in which the lowest agitators move partly out beyond the lower ends of the husking rollers for the purpose set forth.

In testimony whereof I affix my signature.

HENRY L. NELSON.